(12) United States Patent
Sandor

(10) Patent No.: US 6,419,084 B1
(45) Date of Patent: Jul. 16, 2002

(54) THIN COMPACT DISK HOLDER

(75) Inventor: Joseph Sandor, Corona Del Mar, CA (US)

(73) Assignee: Codax Technologies, Inc., Costa Mesa, CA (US)

( * ) Notice: Subject to any disclaimer, the term of this patent is extended or adjusted under 35 U.S.C. 154(b) by 0 days.

(21) Appl. No.: 09/866,406

(22) Filed: May 25, 2001

(51) Int. Cl.[7] ............................................... B65D 85/57
(52) U.S. Cl. .............................. 206/308.1; 206/459.5
(58) Field of Search ............................... 206/303, 307, 206/308.1, 308.2, 310, 459.5, 493

(56) References Cited

U.S. PATENT DOCUMENTS

| | | | | |
|---|---|---|---|---|
| 4,119,200 A | * | 10/1978 | Cassidy et al. | 206/459.5 |
| 4,519,500 A | * | 5/1985 | Perchak | 206/459.5 |
| 5,251,750 A | | 10/1993 | Gelardi et al. | 206/310 |
| 5,685,425 A | * | 11/1997 | Choi | 206/308.1 |
| 5,685,427 A | * | 11/1997 | Kuitems et al. | 206/308.1 |
| 5,779,038 A | * | 7/1998 | Herr et al. | 206/459.5 |
| D438,418 S | | 3/2001 | Myszka et al. | D6/634 |
| 6,196,384 B1 | * | 3/2001 | Belden, Jr. | 206/308.1 |
| D439,786 S | | 4/2001 | Myszka et al. | D6/634 |
| 6,227,362 B1 | * | 5/2001 | Cheung | 206/308.1 |
| 6,237,763 B1 | * | 5/2001 | Lau | 206/308.1 |
| 6,283,285 B1 | * | 9/2001 | Ikebe et al. | 206/308.1 |
| 6,321,811 B1 | * | 11/2001 | Atkinson et al. | 206/308.1 |

* cited by examiner

Primary Examiner—Jim Foster
(74) Attorney, Agent, or Firm—Edgar W. Averill, Jr.

(57) ABSTRACT

Compact disk holder which holds and protects a compact disk, and yet is very thin. The holder has a bottom tray with a disk resting area which is impervious to dust. A center hub is held by the tray. The center hub, when holding a compact disk, pulls the compact disk against the disk resting area of the bottom tray. Preferably, the bottom tray has an outer ring near the outer edge of the compact disk outside of the CD's information containing area. The typical compact disk has a circular ridge inside its information containing area, and the bottom tray is shaped so that this ridge is pulled against its surface so that no dust can get between the outer ridge on the tray and the inner ridge on the compact disk. The bottom tray is preferably free of a cover which further leads to its thin height. The holder can be about one-third the thickness of a conventional jewel case style of compact disk holder.

18 Claims, 8 Drawing Sheets

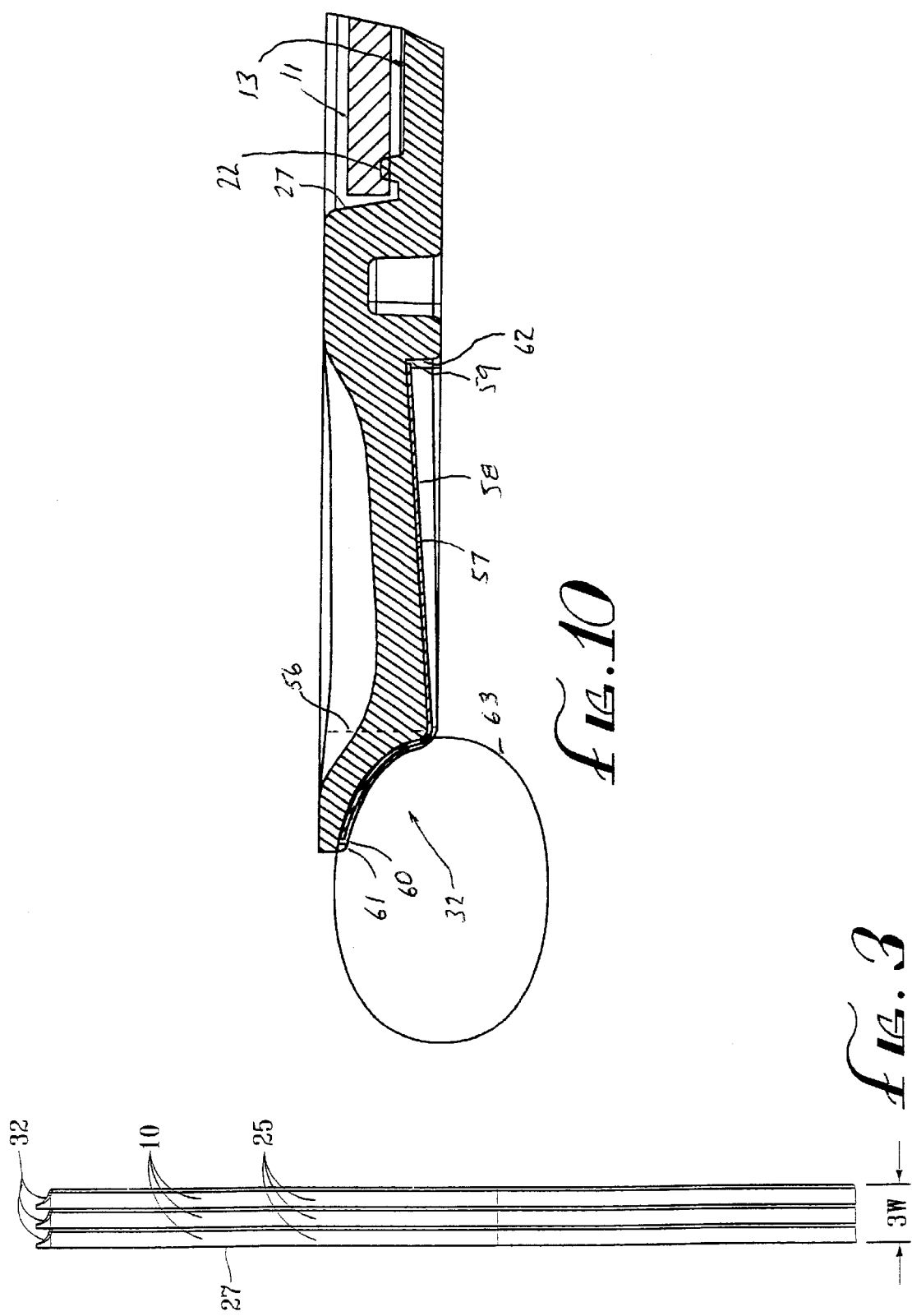

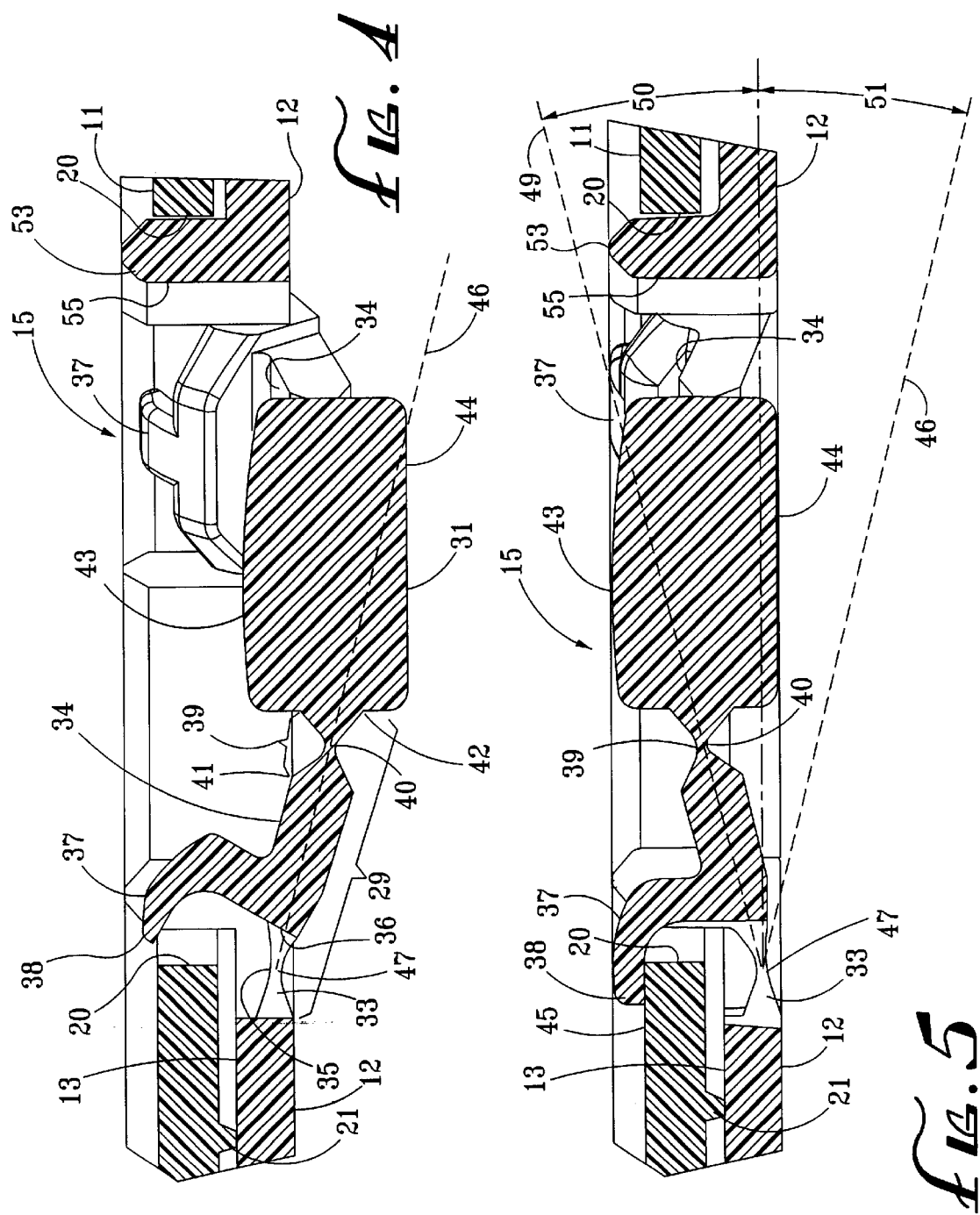

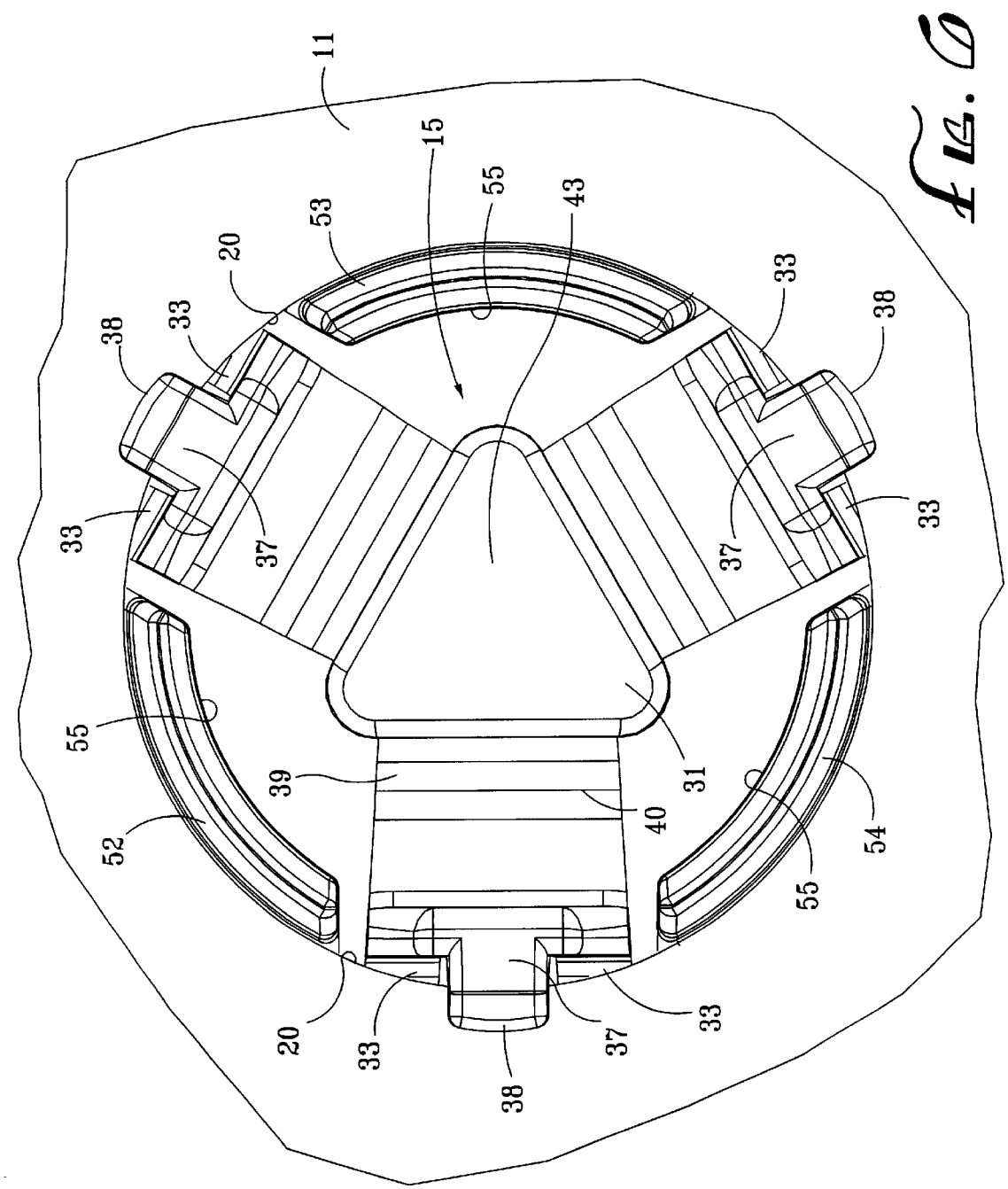

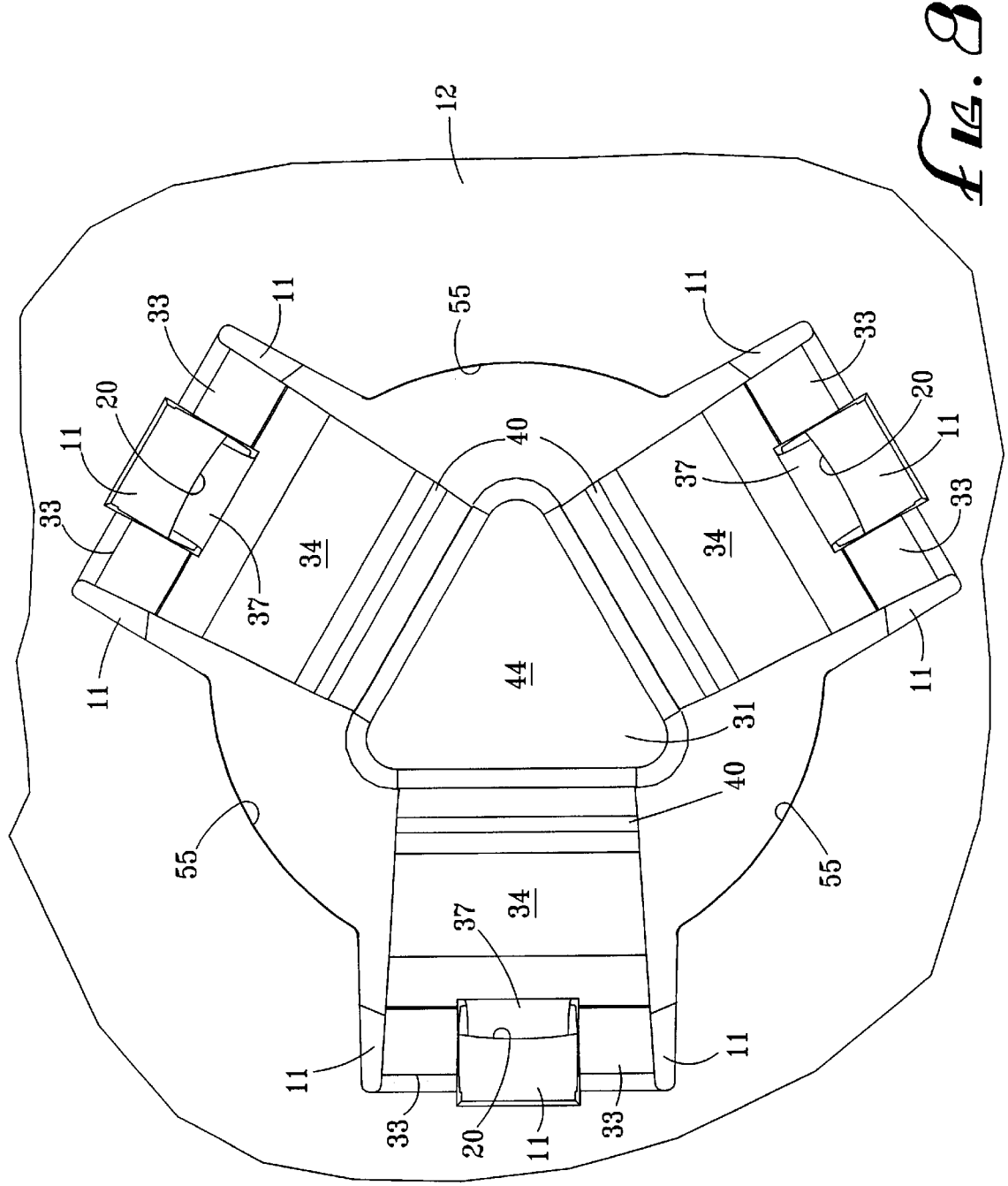

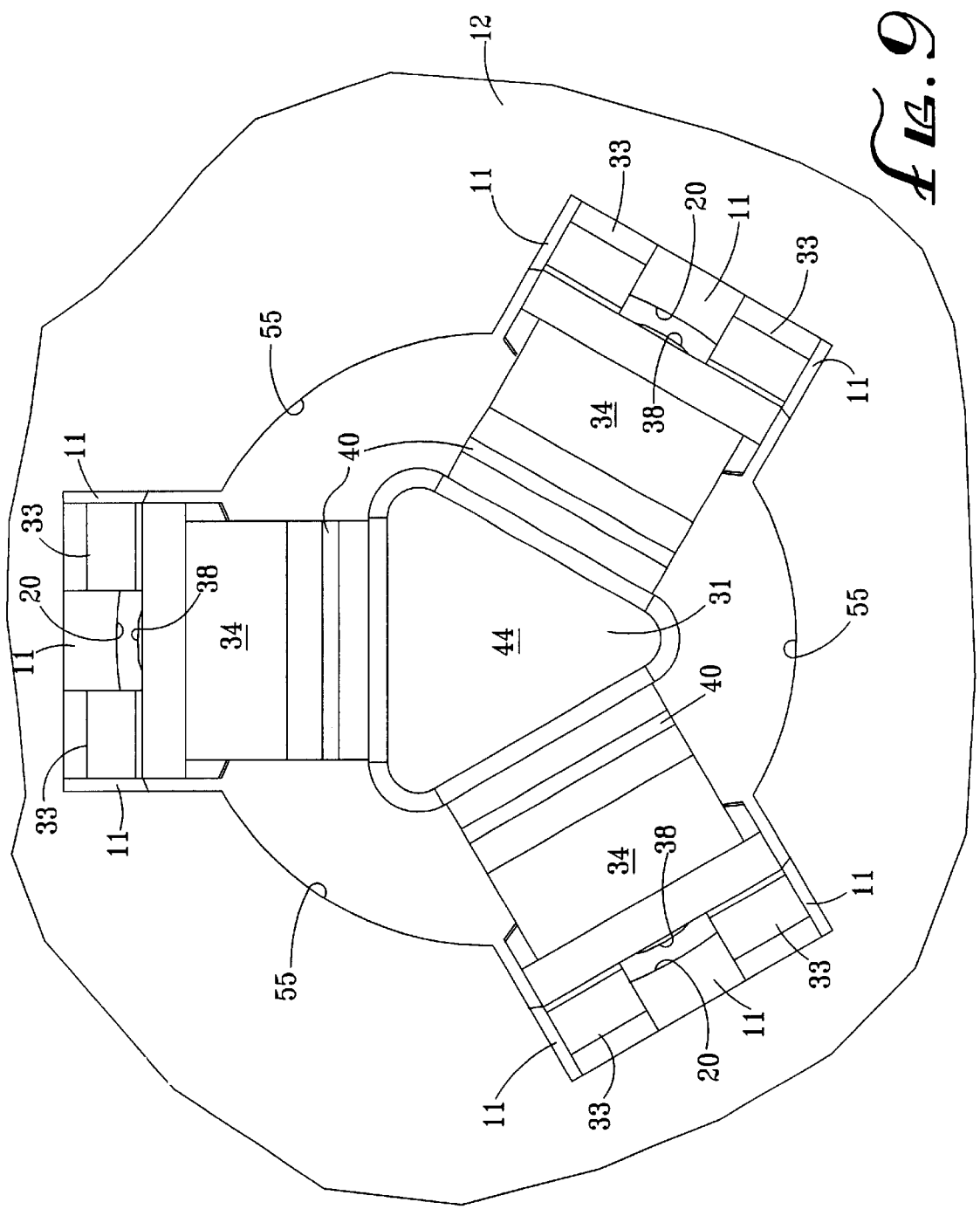

THIN COMPACT DISK HOLDER

BACKGROUND OF THE INVENTION

The field of the invention is compact disk or DVD holders and the invention relates more particularly to CD holders used to store compact disks in a manner so that they may readily be used by pulling them from a shelf or a stack. While the term "compact disk" or "CD" is used herein, it is, of course, intended to include other styles of disks, such as DVDs.

The standard jewel case style of compact disk holder has a clear polystyrene box with a hinged cover. A tray is held inside the box and is very commonly fabricated from a black or dark grey polymer having a recessed circular disk holding area with a center hub. The center hub has a friction-inducing central portion which presses against the hole in the center of the compact disk to hold it on the hub. Below the central portion of the hub is some sort of disk resting surface so that the compact disk is held below the bottom floor of the tray. It is highly beneficial that the information-containing area on the bottom of the compact disk be kept clean so that dust or dirt does not scratch the information-containing area and compromise the information thereon. This is accomplished by the classic jewel case by the combination of the disk being supported above the bottom of the tray and the closed cover which prevents dust and dirt from entering inside the tray area.

The conventional "jewel case" disk holder of the present invention is about 1 cm. in thickness. Although this is not particularly thick, people often collect hundreds of compact disks and, thus, a substantial amount of shelf space is used in storing them.

One way of storing compact disks in a very small width is by storing them in an envelope. The problem with storage in an envelope is that the compact disk is slid in and out of the envelope, and if dust, dirt or sand gets on the inner surface of the envelope, the sliding in and out can very readily cause scratching of the information-containing portion of the disk. Furthermore, the conventional envelope provides no protection against bending.

Another approach to a thin compact disk holder is shown in U.S. Design Pat. Nos. D438,418 and D439,786. These ornamental designs show a compact disk holder with a cover which protects the disk from dust by means of a cover.

Once one wishes to take advantage of a thin compact disk holder to store more compact disks on a shelf, a second problem arises, and that is the problem of identifying a particular compact disk once it is on the shelf. The 1 cm provided by the commonly used conventional jewel case provides sufficient space for an album or game name, but a thinner holder such as that referred to in the above-referenced design patents has insufficient space for such labeling indicia.

Most compact disk holders rely on friction to hold the disk in the holder. It is not uncommon for this friction to be insufficient to withstand shipping or transit and the compact disk can become loose from the center hub. If this happens, scratching of the disk is more likely.

There is, thus, a need for a thin compact disk holder which permits more compact disks to be stored on a shelf than does the conventional jewel case style of compact disk holder. There is also the need for a compact disk holder which prevents dust from reaching the information-containing area of the lower side of the compact disk and which also adds structural support to the disk. There is further a need for a thin compact disk holder which has a spine area sufficiently large to permit indicia to be read when such holder is on a shelf.

BRIEF SUMMARY OF THE INVENTION

It is an object of the present invention to provide a thin compact disk holder which securely retains a compact disk in a manner that dust cannot reach the information-containing area of the compact disk and that also has a spine with sufficient room to enable a user to read a label.

The present invention is for a compact disk holder holding a compact disk. The holder has a bottom tray with a disk resting area impervious to dust and a center hub centrally located in the disk resting area. The center hub has a plurality of disk-securing arms, which provide a biasing force, pulling said retained compact disk in the direction of the disk resting area and which hold the disk in place until it is released and wherein the holder does not have any cover. Preferably, the disk-securing arms are locking arms which prevent the disk from being removed until a release mechanism is moved from a locked position to an unlocked position. Preferably, the disk-retaining arms are biased so that they pull the disk in the direction of the disk resting area and preferably, the disk resting area has an outer circular ridge which contacts an information free outer ring on the bottom of the compact disk. Furthermore, it is preferable that the disk resting area be configured so that it contacts a protruding circular ridge on the bottom of essentially all compact disks so that no dust can enter between the ridge on the compact disk and the outer circular ridge on the disk resting area.

The preferred locking arms include a plurality of hook supporting links which are held to an opening in the center of the tray on an outer edge and to an activation button on the inner edge. A pair of over-center hinges cause the disk-locking arms to move from a lower open stable position. Then when the activation button is moved upwardly, the over-center arms snap to an upper stable area where the hooks push down on that portion of the compact disk around its central opening.

A preferable spine area has an angled label face which increases the label area as compared to an area visible when viewed from a label fixing side directly. Preferably, this label face is curved to further increase the label area.

BRIEF DESCRIPTION OF THE DRAWINGS

FIG. 3 is a left side view of three stacked compact disk holders of the present invention.

FIG. 4 is an enlarged cross-sectional view of the hub portion of the a disk holder of claim 1, showing the disk-securing arms an open configuration.

FIG. 5 is a cross-sectional view analogous to FIG. 4 showing the disk-securing arms in a locked position with the unlocked position shown in phantom view.

FIG. 6 is an enlarged plan view of the disk-securing arms of the holder of the present invention locking a compact disk in the holder.

FIG. 8 is a bottom view of the hub portion of the compact disk holder of FIG. 1, showing a compact disk locked in the holder.

FIG. 9 is a bottom view showing the hub portion of the compact disk holder of FIG. 1, showing the disk-securing arms in an open configuration.

FIG. 10 is an enlarged cut away view of a corner of the spine or label position of the compact disk holder of FIG. 1.

DESCRIPTION OF THE PREFERRED EMBODIMENTS

Figure 1:
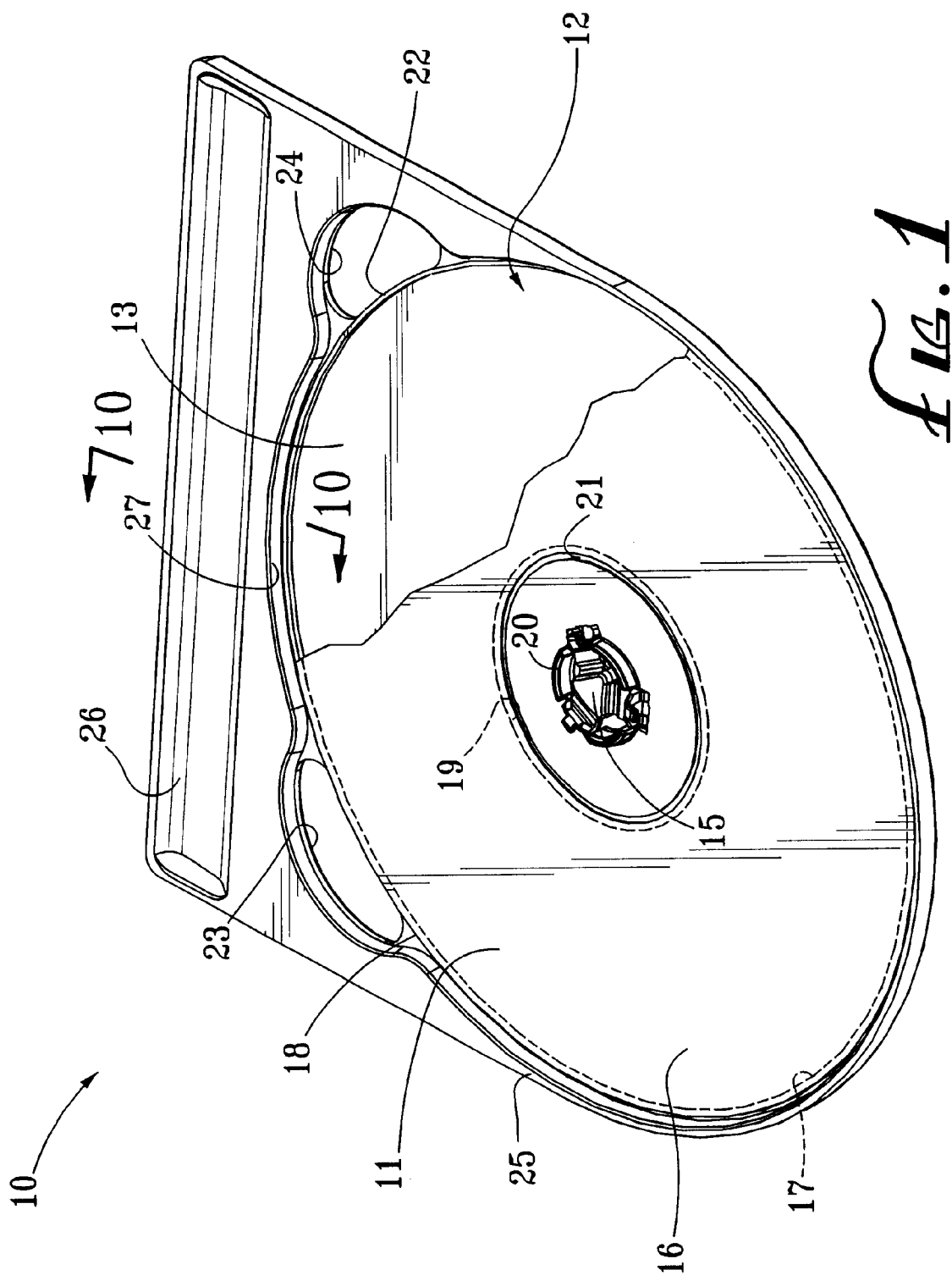
FIG. 1 is a perspective view showing the top, front, and right side of the compact disk holder of the present invention holding a compact disk partially cut away.

The compact disk holder of the present invention is shown in perspective view in FIG. 1 and is indicated generally by reference character 10. A compact disk 11 is held over a bottom tray 12 of compact disk holder 10. Bottom tray 12 has a disk resting area, which is impervious to dust. Disk resting area 13 extends inwardly to a central opening indicated by reference character 14 in FIG. 2. A hub mechanism 15 is held in central opening 14 and moves from the position shown in FIG. 1 where it locks CD 11 in bottom tray 12 to an open position.

Preferably, hub mechanism 15 is configured so it pulls disk 11 toward disk resting area 13 when the hub is holding a CD. Compact disk 11 is of a conventional construction which has an information-containing area 16 on its under surface. It also has an information-free ring 17 on the under surface outside of the information-containing area 16 and inside of an outer peripheral edge 18. An inner information-free ring 19 exists on the under surface of the disk between the information-containing area 16 and the center opening 20 of CD 11. A downwardly extending circular ridge 21 is formed on the under surface of CD 11 within information-free ring 19.

A portion of CD 11 is cut away to show a circular raised ridge 22 extending upwardly from disk resting area 13. As can be readily understood from viewing FIG. 1, if hub mechanism 15 is biased downwardly, it pulls downwardly extending circular ridge 21 against disk resting area 13. It also pulls information-free ring 17 downwardly against circular raised ridge 22. Thus, there is a dust-free area which completely surrounds the information-containing area 16 and protects it from contact with dust during storage.

A pair of openings 23 and 24 is formed through bottom tray 12. These openings extend outwardly beyond the outer peripheral edge 18 of CD 11 and also extend inwardly past outer peripheral edge 18, so that the peripheral edge 18 overhangs both of the openings. The opening extends inwardly until it intersects the circular raised ridge 22. In this way, once the CD is released by hub mechanism 15, the user may easily place a finger in one of the openings and lift the CD out.

Bottom tray 12 has an outer wall 25. Wall 25 extends upwardly with respect to the upper surface of CD 11 as shown in FIG. 1. About half of the wall is formed close to the outer peripheral edge 18 of CD 11. The remainder of the wall extends around openings 23 and 24 and around the rest of the outer peripheral edge 18. The portion of the wall between openings 23 and 24 is identified by reference character 27.

Figure 2:
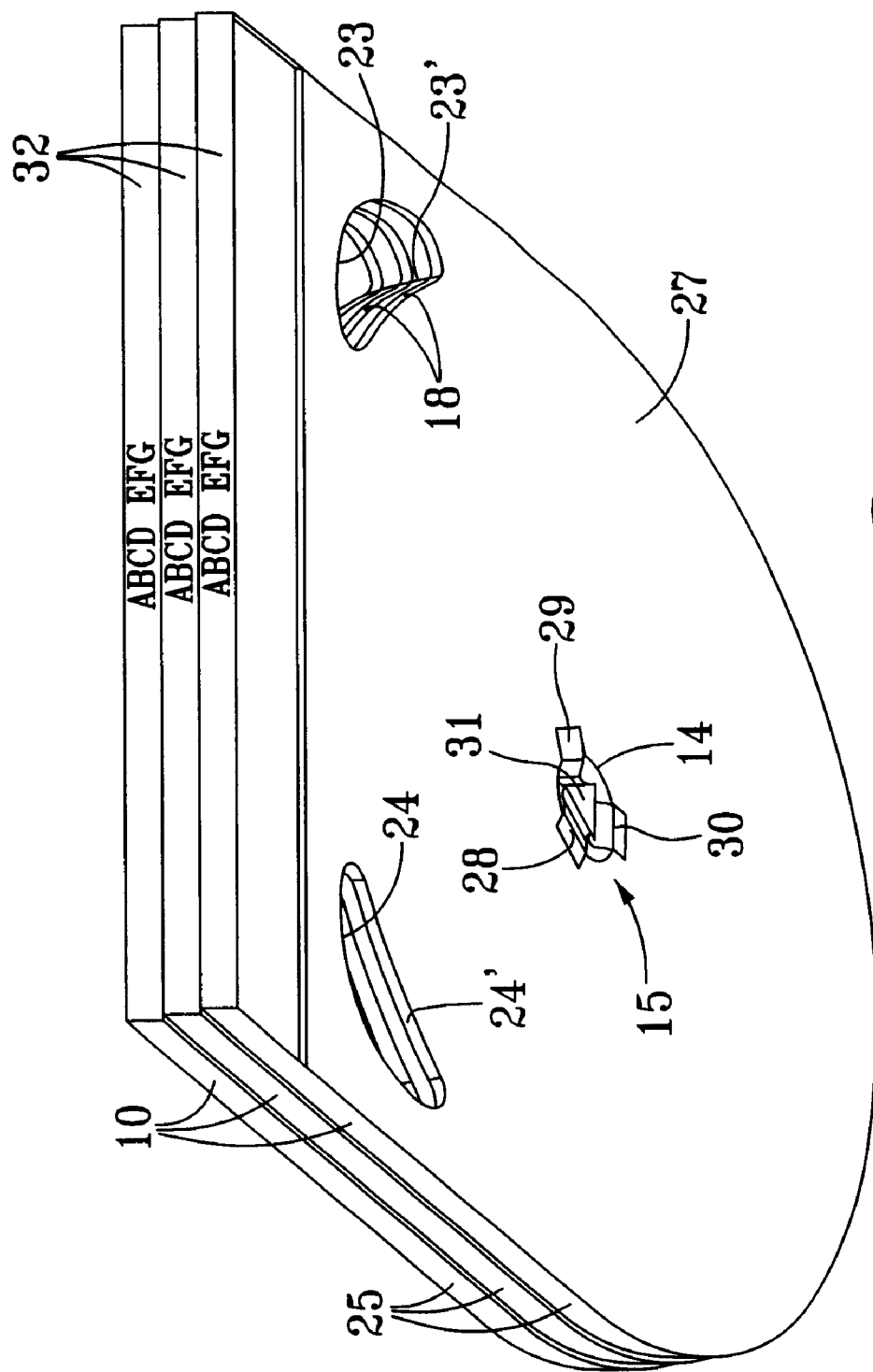
FIG. 2 is a perspective view of three stacked compact disk holders showing the bottom, label, or spine edge and right side of the compact disk holder of the present invention.

An important advantage of the CD holder of the present invention is its thin profile. FIG. 2 shows three stacked CD holders, each with a retained CD, which equals the thickness of one of the conventional jewel case CD holders. In this way, three times as many CDs may be stored on a shelf as compared to the number stored in conventional jewel cases. The openings 23 and 24 can be seen extending from the bottom surface 27. It can be seen that the CDs have outer peripheral edges 18 which extend past an inner edge 23' and 24' of openings 23 and 24, respectively.

It can also be seen in FIG. 2 that the outer raised wall 25 of the lowermost CD abuts the bottom surface of the abutting superior CD holder. In this way, an adjacent CD functions in a manner analogous to a cover in many regards.

It can also be seen in FIG. 2 that central opening 14 supports hub mechanism 15 through three arms 28, 29, and 30. A center activation button 31 operates mechanism 15 described below.

The spine 32 is both angled and curved, as also described below, to provide a larger area for indicia than would be available if it were simply a flat vertical edge.

Three CD holders 10 are shown in FIG. 3 from a side view. The thickness of three adjacent CD holders is indicated by reference character 3W and is approximately 0.4 inches, or approximately 1 cm. The curvature of the spine is also shown in FIG. 3.

An enlarged cross-sectional view of hub mechanism 15 in an open position is shown in FIG. 4. The hub mechanism has three arms and arm 29 is shown in FIG. 4. Arm 29 includes an outer hinge 33 which extends outwardly from central opening 14. Outer hinge 33 has an outer hinge pivot center 35 which is a thin section of outer hinge 33.

Outer hinge 33 is connected to link body 34 at link outer end 36. Link body 34 has an upwardly and outwardly extending disk locking hook 37 which terminates in a disk engaging protrusion 38.

As shown in FIG. 4, disk locking hook 37 is in a retracted configuration so that the compact disk 11 is free to be removed. Also shown in FIG. 4, is downwardly extending circular ridge 21, which is formed on the underside of most compact disks and this contacts disk resting area 13.

Arm 29 also has an inner hinge 39, which has an inner hinge pivot center 40. Inner hinge 39 is connected to link body 34 at link inner end 41 and to center activation button 31 at an inner end 42.

Center activation button 31 has an upper finger contact surface 43. To release compact disk 11, the user holds the CD holder 10 and presses surface 43 downwardly to the position shown in FIG. 4. To once again lock the CD in place, the user presses the lower finger contact surface 44 and raises the hub mechanism 15 to the position shown in FIG. 5. When this happens, the two living hinge pivot points 40, 47 pass over center when the mechanism goes from an open configuration to a closed configuration and conversely from a closed configuration to an open configuration. Because of the inherent flexibility of the polymer from which the holder is fabricated, the intermediate position is unstable. The mechanism is stable in an upper position and a lower position. The lower position shown in FIG. 4 is a stable position. The upper position shown in FIG. 5 is a stable position because the disk engaging portion 38 contacts the upper surface 45 of CD 11. The hub mechanism 15 would actually raise an additional distance since the stable position of the hub mechanism 15 when no disk is present is higher than that shown in FIG. 5. This is an important feature of the present invention in that because the hub mechanism's stable position shown in FIG. 5 is stable only because of the presence of CD 11. Since the hub mechanism is configured so that the pivot points are not in an upper relaxed position, they provide a continued biasing force whereby the disk engaging portion 38 presses downwardly on the upper surface 45 of CD 11. Because of this, it tends to hold the downwardly extending circular ridge 21 against disk resting area 13. It also tends to hold information-free ring 17 against circular raised ridge 22, thus, preventing dust from contacting information-containing area 16.

A line 46 extends through the center of living hinge pivot points 47 and 40. This line 46 is about 15° (indicated by reference character 51) from a center line 48, which also passes through living hinge pivot point 47. An upper line 49 passes through living hinge pivot points 47 and 40 and is about 12° (indicated by reference character 50) from center line 48.

As seen clearly in FIG. 5, CD 11 is, in fact, locked in place and is not simply being held by friction. Although the hub mechanism of the present invention can be operated simply with friction, it is preferred that the hub be capable of actually locking the disk in place so that no amount of dropping will cause CD 11 to fall out of the holder 10.

The holder is preferably fabricated from polyethylene or polypropylene so that the living hinges will be capable of flexing a very large number of times without cracking. The difference between the upper and lower flexing of the hub mechanism with a CD present is shown in FIG. 5 by comparing lock angle 50 between center line 48 and upper line 49 with unlock angle 51. Unlock angle 51 is formed between center line 48 and line 46 when the hub mechanism is in an unlocked configuration.

A top view of hub mechanism 15 is shown in FIG. 6. There it can be seen that CD 11 is centered by three disk locating arcs 52, 53, and 54, each of which have an angled face which helps position the center opening 20 of CD 11 around hub mechanism 15.

It can also be seen that outer hinge 33 is formed in two segments with a center opening to permit the molding of hook 37. Inner hinge 39 is molded in one piece.

Figure 7:
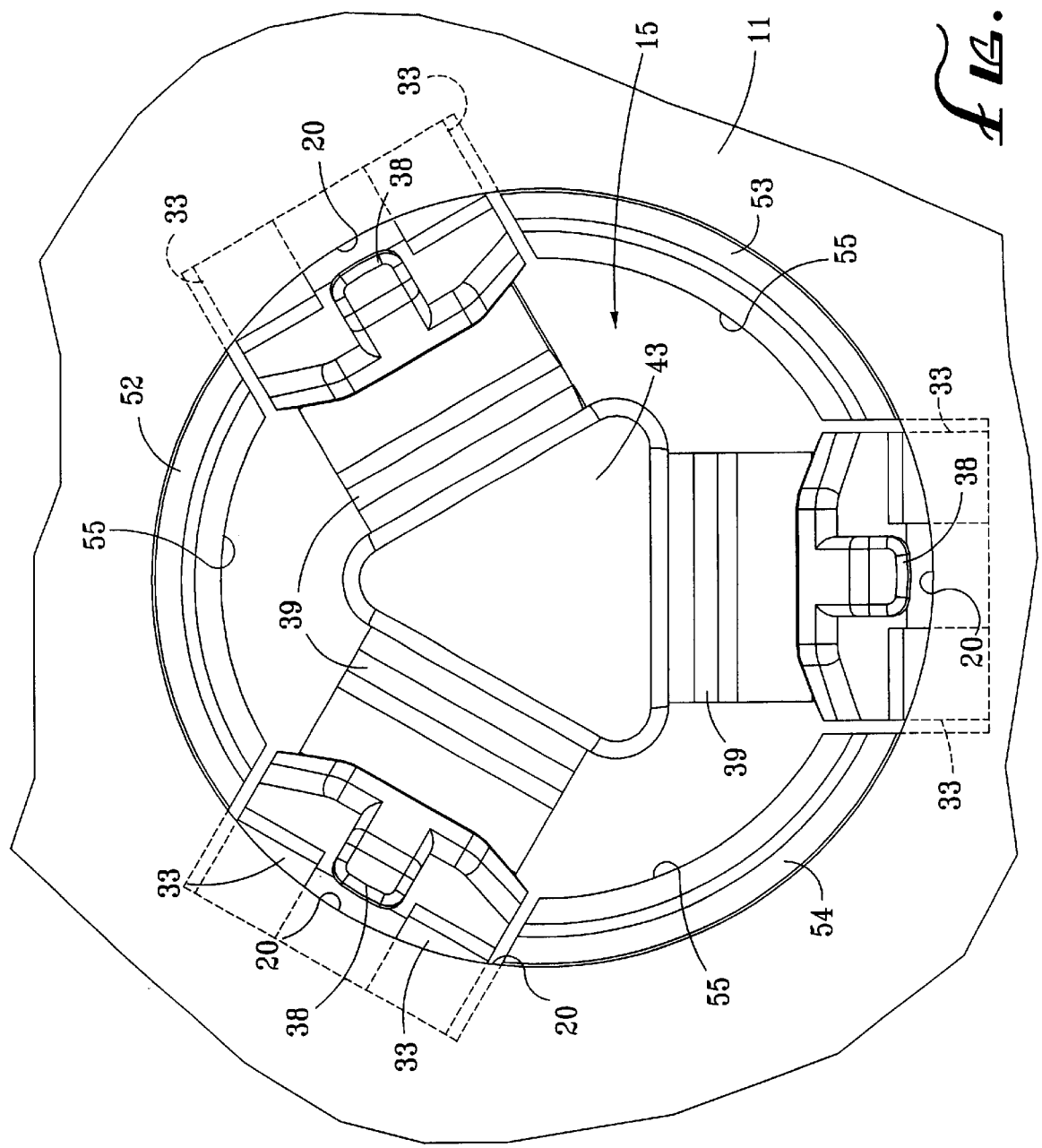
FIG. 7 is a plan view analogous to FIG. 6, but showing the securing arms in an open configuration.

While FIG. 6 shows the disk locking arms in a closed position, FIG. 7 shows them in an open position where the CD is present but released.

A bottom view of the hub mechanism in a closed position is shown in FIG. 8. There it can be seen from the underside how the outer hinge 33 is formed in two separate portions surrounding the disk locking hook 37. The underside of center activation button 31 is shown and its lower finger contact surface 44 is exposed for activation from below the disk holder. The under surface of the CD is indicated by reference character 11 in FIG. 8.

FIG. 9 shows the open position of the hub locking mechanism as viewed from below the CD holder. Once again, the CD is indicated by reference character 11 in FIG. 9. The tip of disk engaging protrusion 38 is barely shown in FIG. 9 since it is in a retracted position away from the inner edge 20 of CD 11. The hub opening is indicated by reference character 55 in FIG. 9.

The result of the construction of the CD holder of the present invention permits the holding of CDs in a remarkably small width for a rigid holder. That is, although an envelope can provide a smaller width, it has the major disadvantage of requiring a sliding in and out motion of the CD which is potentially damaging to the information-containing area of the CD. The CD holder of the present invention is loaded and unloaded by a vertical separation of the CD from the holder without any sliding required at all.

Another important feature of the present invention is indicated in FIG. 10. While it is highly desirable to have a very thin CD holder, this does lead to a problem. That problem is the inherent limitation of writing space on the spine or outer visible edge of the CD holder. The CD holder of the present invention has an unusual angled label area shown best in FIG. 10 of the drawings. The label area is indicated by reference character 32, which also shows in FIG. 3 of the drawings. Because the label area 32 is angled, it has a greater visible writing area than if it were at a right angle to the bottom surface 27, as indicated by the phantom line 56 in FIG. 10. Preferably, the label area is not only angled, but also has a concave surface as shown in FIG. 10. It is further preferable that the concave surface is in the shape of a portion of an elipse 63. It is often possible to read printing even if only a horizontal slice of the printing is visible. By shaping label area 32 as a portion of an elipse, it is positioned so that from most visible directions, a portion of the label surface is at a 90° angle to the viewing direction and, thus, at a maximum visible angle. In contrast, if the label were formed flat and at an angle, there would by only one place that would be at a 90° angle to the viewer. The concave label area 32 is, thus, surprisingly readable even though the holder is very thin. Another beneficial feature of the present invention is the presence of an upwardly angled surface 57 on the underside of the CD holder. This permits a label 58 having an inner edge 59 to be secured to the CD holder as shown in FIG. 10 in a manner so that its inner edge 59 is not subject to edge contact when the holder is on a table or slid into a row of CD holders. Also, the upper edge 60 is protected by an overhang 61, so that it is also not subject to contact by the user's fingers or other objects. Thus, the label 58 is protected at its inner edge by wall 62 and its upper edge by overhang 61. As set forth above, its angled reading surface makes identifying the disk much easier than if it were at a right angle indicated by reference character 56. Also, the upper angled surface 57 permits the use of a larger label which is easier to manipulate.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A compact disk holder and retained compact disk comprising:

a retained compact disk having a central opening and an outer peripheral edge and at least one information-containing side, said information-containing side having a central information free circle and an outer information free periphery and an information-containing area between said central information-free circle and said outer information free periphery and said information-containing area being protected when held by said compact disk holder so that it is kept dust free;

a bottom tray having a disk resting area impervious to dust, a center hub centrally located in said disk resting area, said center hub including a plurality of disk-securing arms which provide a biasing force pulling said retained compact disk in the direction of said disk resting area and wherein said disk resting area includes an outer barrier which forms an outer dust barrier which contacts said compact disk and said bottom tray and prevents dust from reaching the information-containing area from said outer peripheral edge and said disk resting area being configured to form an inner dust barrier between said center hub and said information area and prevents dust from reaching the information-containing area from said central opening and wherein said bottom tray is free of any cover whereby one side of said retained compact disk is exposed when the retained compact disk is retained by said holder in a storable configuration.

2. The compact disk holder of claim 1 wherein said disk resting area includes an outer circular peripheral raised ridge which raised ridge extends upwardly from said disk resting area and is positioned so that it contacts said outer information-free periphery.

3. The compact disk holder of claim 2 further including at least one opening through said bottom tray located outside of said outer circular peripheral raised ridge adjacent said disk resting area and extending toward said center hub inwardly toward said outer circular peripheral raised ridge to a distance so that it extends inwardly from the outer peripheral edge to facilitate the removal of a compact disk from said compact disk holder.

4. The compact disk holder of claim 1 further including an outer wall positioned outwardly from said outer peripheral edge of said compact disk and said outer wall extending upwardly from said bottom tray to an outer plane which extends above said retained compact disk.

5. The compact disk holder of claim 4 wherein said outer wall extends completely around said bottom tray.

6. The compact disk holder of claim 1 wherein said disk securing arms are locking arms and lock the retained compact disk in place until a release mechanism is moved from a locked position to an unlocked position.

7. A compact disk holder and retained compact disk comprising:
   a retained compact disk having a central opening and at least one information-containing side, said information-containing side having a central information free circle and an outer information free peripheral area and an information-containing ring between said central information-free circle and said outer information-free peripheral area and said retained compact disk having a central, circular opening having an adjacent upper ring surface and an inwardly-facing ring surface;
   a bottom tray having a disk resting area and a CD locking hub held in a hub opening therein, said CD locking hub comprising:
   at least two disk holding arms each having:
      an outer hinge connected to said bottom tray at said hub opening and said outer hinge having an outer hinge pivot center and said outer hinge having an outer hinge inner end;
      a disk holder supporting link attached to said outer hinge inner end, said disk holder supporting link having a link body which holds an upwardly and outwardly extending disk securing portion, and said disk holder supporting link having a link inner end and said disk holder supporting link and said disk securing portion pivots with respect to said bottom tray about said outer hinge pivot center between an upper secured position and a lower unsecured position;
      an inner hinge connected to said disk holder supporting link and said inner hinge having an inner hinge pivot center and said inner hinge having an inner hinge inner end;
      an activation button attached to said inner hinge inner end, said activation button having a button body having an upper contact surface and a lower contact surface; and
      wherein each of said at least two disk holding arms are configured so that said inner hinge and said outer hinge pivot centers are over center when said activation button is in an upper stable position and under center when said activation button is in a lower stable position so that said activation button has an upper stable position and a lower stable position so that a line intersecting said inner hinge pivot center and said outer hinge pivot center forms an angle above a hub outer hinge pivot plane when said activation button is in an upper secured position and said disk holding arms are holding a compact disk and at an angle below said hub outer hinge pivot plane when said activation button is in a lower unsecured position and said activation button is in an unstable position when said activation button is between said upper secured position and said lower unsecured position and wherein said disk securing portion has a disk engaging portion which engages said compact disk adjacent said central opening of said retained compact disk and which disk engaging portion extends outwardly with respect to said outer hinge pivot center so that said disk engaging portion holds said retained compact disk in a secured position when said activation button is in its upper secured position.

8. The compact disk holder of claim 7 wherein there are at least three disk holding arms.

9. The compact disk holder of claim 8 wherein there are three disk holding arms.

10. The compact disk holder of claim 7 wherein each disk holding arm has two outer hinges, one outer hinge on each side of said disk securing portion.

11. The compact disk holder of claim 7 wherein said compact disk holder has an upper planar edge and a lower planar edge and said upper contact surface and said lower contact surface of said activation button are between said upper planar edge and said lower planar edge when said activation button is in its upper stable position holding a compact disk.

12. A compact disk holder and retained compact disk wherein said compact disk holder has a thickness between an upper planar edge and a lower planar edge comprising:
   a bottom tray having a disk resting area, a center hub centrally located in said disk resting area, and a compact disk holder outer peripheral edge including a label-containing edge, said label containing edge comprising:
      an angled label face area extending from said lower planar edge to said upper planar edge, said angled label face having an upper face edge and a lower face edge and one of said upper and lower face edges extending further from said center hub than the other of said upper face and lower face edges whereby said label face area has a larger surface area than an area subtended by an outer periphery of said label face when viewed from a label-facing side of said bottom tray.

13. The compact disk holder of claim 12 wherein said angled label face area is formed in a concave curve and is a curved label face area.

14. The compact disk holder of claim 13 wherein said curved label face area has its lower face edge closer to said center hub than its upper face edge.

15. The compact disk holder of claim 13 wherein said curved label face area is in the shape of a portion of an elipse.

16. The compact disk holder of claim 13 wherein said curved label face area extends around to a bottom of said bottom tray to facilitate the affixing of a label which covers an outwardly facing area of said label face area and a bottom facing area of said label face area.

17. The compact disk holder of claim 16 wherein said outwardly facing area of said label face area and said bottom facing area of said label face area have a peripheral wall extending outwardly with respect to said label face area to cause an edge of a label adhered to said label face area to be protected from side contact.

18. The compact disk holder of claim 17 wherein said bottom label face area is angled upwardly with respect to a bottom edge of the outer peripheral edge of said bottom tray so that an inner edge of said bottom facing area has a peripheral wall which extends upwardly from a bottom surface of said bottom tray.

* * * * *